United States Patent [19]

Berlongieri

[11] 4,298,177

[45] Nov. 3, 1981

[54] AIRCRAFT SAFETY APPARATUS

[76] Inventor: John J. Berlongieri, 14873 Lincoln Ave., Dolton, Ill. 60419

[21] Appl. No.: 92,794

[22] Filed: Nov. 9, 1979

[51] Int. Cl.³ .............................................. B64D 17/80
[52] U.S. Cl. ..................................... 244/139; 244/52; 244/100 R; 244/105
[58] Field of Search .................. 244/17.15, 52, 100 A, 244/105, 107, 138 R, 139, 140, 147

[56] References Cited

U.S. PATENT DOCUMENTS

| | | | |
|---|---|---|---|
| 1,938,853 | 12/1933 | Miller | 244/139 |
| 2,077,910 | 4/1937 | Thomson | 244/140 |
| 2,395,435 | 2/1946 | Thompson et al. | 244/52 |
| 3,129,909 | 4/1964 | Smith | 244/139 |
| 3,833,192 | 9/1974 | Vitack et al. | 244/139 |

Primary Examiner—Charles E. Frankfort
Attorney, Agent, or Firm—Bernard L. Kleinke

[57] ABSTRACT

Aircraft safety apparatus includes front and rear parachutes mounted at the front and rear portions of the aircraft for adding to the buoyancy thereof during emergency landings. Devices are provided for moving the parachutes into their operating positions. A plurality of auxiliary jet propulsion units containing fluid under pressure propel the aircraft to aid in its manueverability should the aircraft malfunction in flight, as well as during emergency landing procedures. At least some of the jet propulsion units are directed transversely to the body of the aircraft to direct fluid under pressure laterally to cause lateral reaction movement of the aircraft for steering purposes while the aircraft is descending under parachute assist.

7 Claims, 4 Drawing Figures

AIRCRAFT SAFETY APPARATUS

DESCRIPTION

1. Technical Field

The present invention relates in general to aircraft safety apparatus. More particularly, it relates to apparatus for assisting malfunctioning or disabled aircraft to gain maneuverability and to make relatively safe landings.

2. Background Art

Different types and kinds of aircraft safety apparatus have been employed. For example, parachutes have been used in connection with airplanes to retard the speed thereof during landing procedures. However, it would be highly desirable to have aircraft safety apparatus which would assist the maneuverability of disabled aircraft and would assist in emergency landing operations. In this regard, it would be desirable where an airplane or other aircraft that loses power could remain airborne for longer periods of time, so that the aircraft could cruise to a relatively safe landing and remain maneuverable during such emergency landing procedures to avoid disasters, thereby protecting lives and equipment.

DISCLOSURE OF INVENTION

The principal object of the present invention is to provide new and improved aircraft safety apparatus, which assists the manueverability thereof and which is useful in the emergency landing of aircraft vehicles during the malfunctioning thereof.

Briefly, the above and further objects of the present invention are realized by providing front and rear parachutes mounted at the front and rear portions of the aircraft for adding to the buoyancy thereof during emergency landings. Devices are provided for moving the parchutes into their operating positions. A plurality of auxiliary jet propulsion units containing fluid under pressure propel the aircraft to aid in its maneuverability should the aircraft malfunction in flight, as well as during emergency landing procedures. At least some of the jet propulsion units are directed transversely to the body of the aircraft to direct fluid under pressure laterally therefrom to cause lateral reaction movement of the aircraft for steering purposes while the aircraft is descending under parachute assist.

BRIEF DESCRIPTION OF THE DRAWINGS

The above-mentioned and other objects and features of this invention and the manner of attaining them would be best understood by reference to the following description of an embodiment of the invention taken in conjunction with the accompanying drawings, wherein:

FIG. 4 is another schematic wiring diagram of another control circuit for the jet propulsion units of the apparatus of FIG. 1.

BEST MODE FOR CARRYING OUT THE INVENTION

Figure 1:
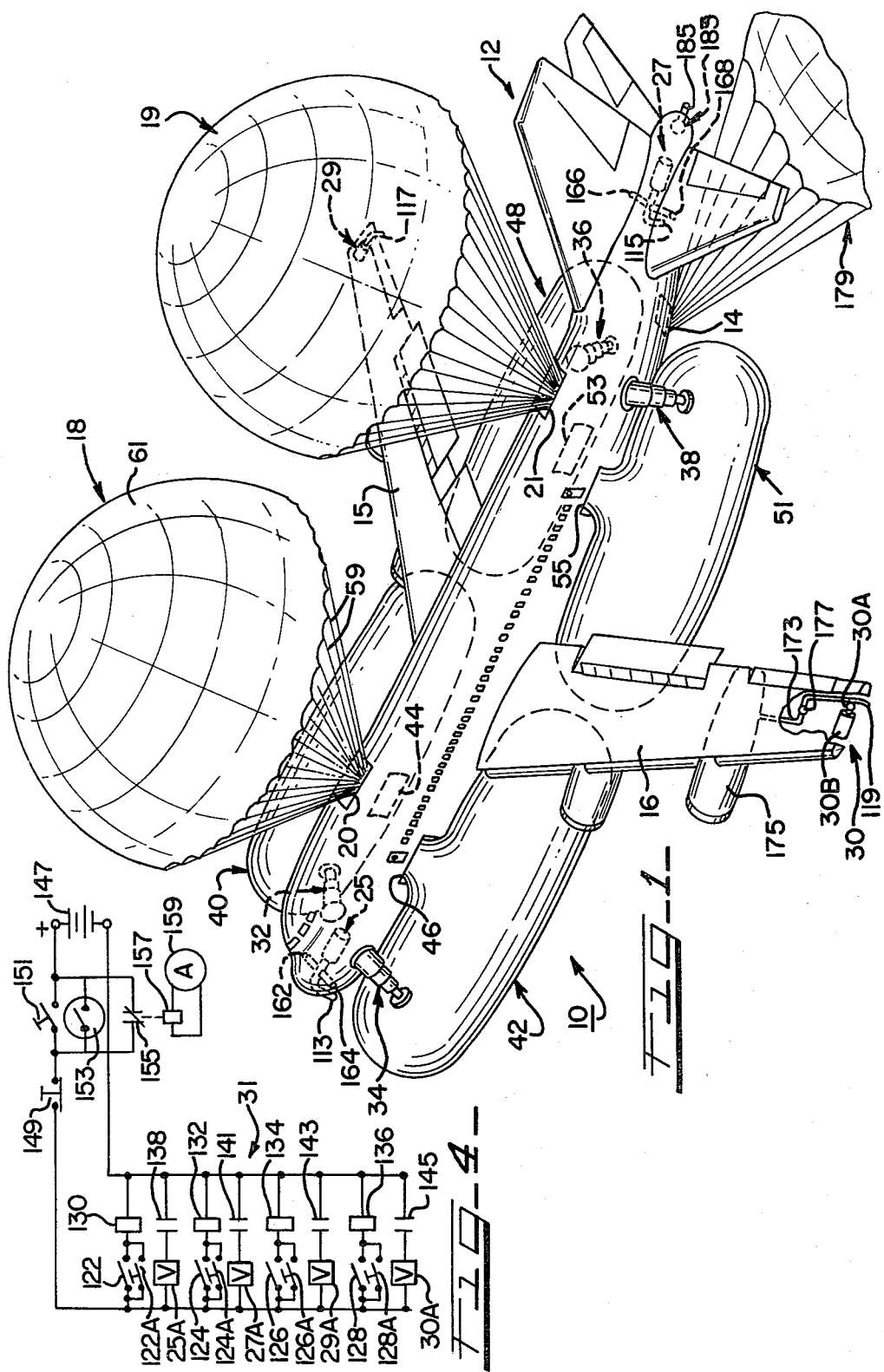
FIG. 1 is a pictorial view of the aircraft safety apparatus, which is constructed in accordance with the present invention.
Figure 3:
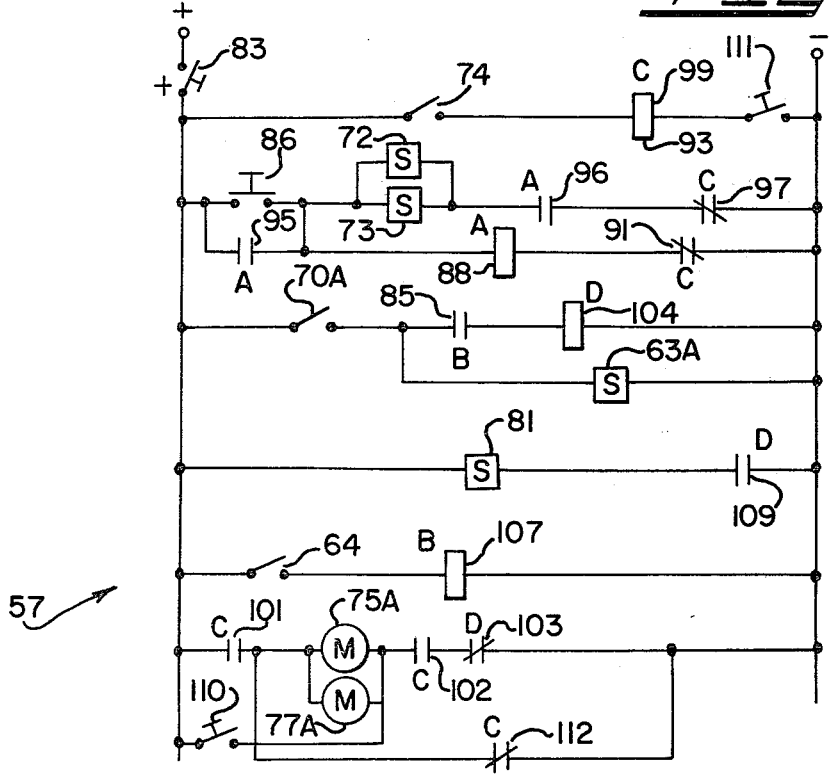
FIG. 3 is a schematic wiring diagram of a control circuit for the parachute ejecting assembly of the apparatus of FIG. 1.

Referring now to the drawings and more parcticularly to FIG. 1 thereof, there is shown aircraft safety apparatus 10 which is constructed in accordance with the present invention and which assists the operation of a malfunctioning aircraft 12, which includes a body 14 and a pair of wings 15 and 16. In this regard, should the aircraft 12 lose power during a malfunction, the safety apparatus 10 of the present invention assists in the maneuverability and the safe landing of aircraft 12 as hereinafter described in greater detail. The apparatus 10 generally comprises front and rear parachutes 18 and 19 disposed at the respective front and rear portions of the aircraft 12. A pair of door openings 20 and 21 in the upper portion of the body 14, as hereinafter described in greater detail, permit the respective parachutes 18 and 19 to be ejected therethrough into their operating positions as shown in FIG. 1 of the drawings. In this regard, as shown in FIG. 3 of the drawings, a parachute ejecting assembly 23 propels the parachute 18 through the door opening 20 as hereinafter described in greater detail, it being understood that a similar ejecting assembly (not shown) being provided for the rear parachute 19. It should be understood that, while a single parachute is shown for both the front and rear portions of the aircraft 12, it will become apparent by those skilled in the art that either additional parachutes (not shown) may be required or parachutes of larger sizes may be necessary to accommodate given aircraft to enable them to float safely downwardly during an emergency landing procedure.

A pair of front and rear jet propulsion units 25 and 27 are disposed at the front and rear portions of the aircraft 12 and contain air or other suitable fluid under pressure for releasing same selectively to assist the maneuverability of the aircraft both during emergency landing procedures under parachute assist as well as during in-flight correctable temporary power failures. Similarly, right and left automatically operated jet propulsion units 29 and 30 are disposed at the tips of the respective wings 16 and 15 and are directed downwardly to assist in the maneuverability of the aircraft 12. As shown in FIG. 4 of the drawings, a control circuit 31 is employed to deactivate selectively the jet propulsion units by the pilot of the aircraft and by the occurrence of other conditions as hereinafter described in greater detail. Front telescoping shockabsorbing legs 32 and 34 are disposed at the front end portion of the aircraft for the purpose of facilitating the emergency landing of the aircraft 12 on hard surfaces. Similarly, rear telescoping shock-absorbing legs 36 and 38 are disposed at the rear portion of the aircraft 12 to further absorb shocks during the emergency landing of the aircraft on hard surfaces such as ground.

A pair of front inflatable air bag pontoons 40 and 42 which extend from a pair of front door openings 44 and 46 on opposite sides of the front end of the body 14 of the aircraft 12 for supporting the front portion of the aircraft 12 on a body of water (not shown) should the aircraft be forced to land thereon during an emergency. Similarly, a pair of rear inflatable air bag pontoons 48 and 51 extend from opposite sides of the rear portion of the body 14 through a pair of rear door openings 53 and 55 to support the rear portions of the airplane 12 on a body of water. Thus, the airplane 12 is protected for emergency landings on both land and sea.

As shown in FIG. 3 of the drawings, a parachute ejection control circuit 57 is employed with the parachute ejecting assembly of FIG. 2 for the parachute 18 for releasing it automatically as hereinafter described in greater detail. It should be understood that a similar injection control circuit (not shown) is also employed with the rear parachute 19.

Figure 2:
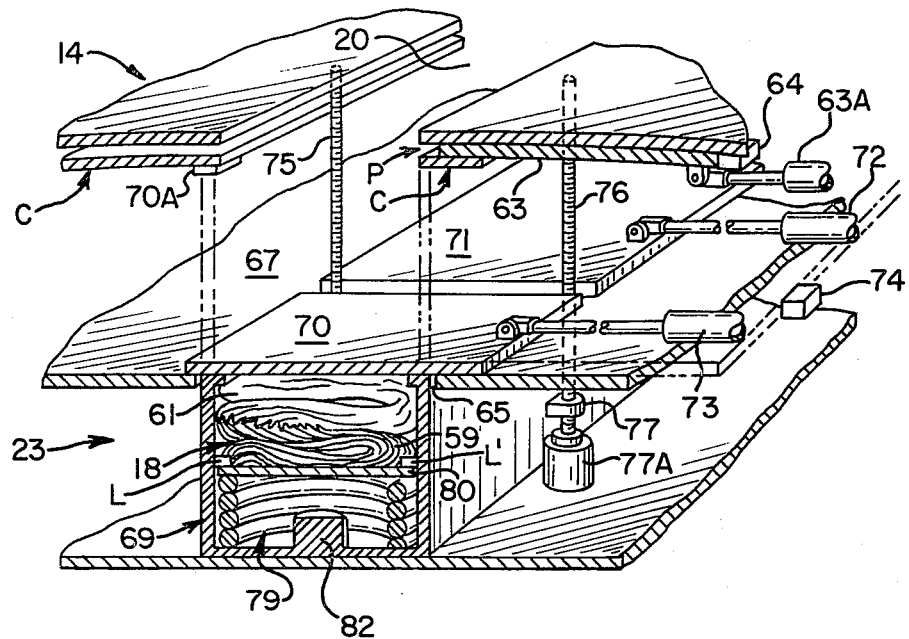
FIG. 2 is a cross-sectional pictorial view of the parachute ejection apparatus of the safety apparatus of FIG. 1.

Considering now the ejecting assembly 23 for the front parachute 18 with reference to FIG. 2 of the drawings, the front parachute 18 is shown folded in its storage position within the apparatus 23. In this regard, the lines 59 and the envelope 61 of the parachute 18 are shown in its folded position for storage purposes. In order to eject the parachute 18, a sliding door 63 is moved by a solenoid 63A from a closed position over the opening 20 to an opened position into a pocket P formed by ceiling and outer walls of the airplane body against a limit switch 64 associated with the control circuit 57 as hereinafter described in greater detail. In order to maintain the interior of the airplane in its presurized condition before the ceiling door 63 is opened, the parachute 18 is transferred upwardly through an opening 65 in the floor 67 of the airplane 12, the folded parachute 18 being normally stored within a vertically movable opened-top compartment or box 69 disposed below the floor 67 opposite the opening 65 and movable in sealing engagement with the ceiling C. Sliding doors 70 and 71 cover over the floor opening 65 until the parachute is ready for ejection. It will become apparent to those skilled in the art that additional parachutes (not shown) may be stored within the compartment 69 in the event that a plurality of parachutes are required to support the front portion of the airplane 12.

In order to open the sliding floor doors 70 and 71, a pair of solenoids 72 and 73 retract the respective door 70 and 71 horizontally from their closed position over the floor opening 65 to their opened position as shown in broken lines in FIG. 2 of the drawings against a limit switch 74 of the control circuit 57 as hereinafter described in greater detail. A pair of vertically disposed threaded rods 75 and 76 extend through a pair of nuts, such as the nut 77 receiving the rod 76, fixed to opposite sides of the compartment 69 below the floor 67, so that a pair of motors, such as the motor 77A, drive the rods 75 and 76 to elevate the compartment 69 from its storage position below the floor 67 upwardly through the floor opening 65 to an upper position over the opening 20 into sealing engagement with the ceiling C against a limit switch 70A of the control circuit 57 as shown in phantom lines, as hereinafter described in greater detail.

A coiled compression spring 79 urges resiliently a plate 80 disposed under the folded parachute 18 upwardly in axial alignment with the floor opening 65 and the ceiling opening 20 and extends between the plate 80 and a boss 82. A solenoid 81 (FIG. 3) is operated to disengage a pair of mechanical latches L and L' to free the plate 80 to cause it to snap upwardly from its retracted position as shown in the drawings to an upper position for ejecting the parachute outwardly through the opening 20. Thus, the coiled spring 79 is released to eject the parachute 18 from the opened-top compartment 69 and out the ceiling opening 20.

Considering now the control circuit 57 in greater detail with reference to FIG. 3 of the drawings, the circuit 57 includes a manually-operated on-off switch 83 to connect a source of direct current to the circuit 57. It should be understood that the switch 83 could also be automatically operable as is well known in the art. A momentary push-button switch 86 is closed manually for the purpose of operating an A relay 88, which operates from a path including the switch 86, the relay 88, and a normally closed contact 91 of a C relay 93. A pair of latching contacts 95 are connected across the switch 86 to latch the relay 88 once it operates. A normally opened pair of contacts 96 of the A relay, when closed, energizes the floor solenoids 72 and 73 through a pair of normally closed contacts 97 of the C relay. The solenoids 72 and 73 retract the sliding floor doors 70 and 71 in preparation for the ejection of the parachute 18. The doors retract rearwardly until they engage the limit switch 74, which operates C relay 93. When the C relay operates, it closes its contacts 101 and 102 to energize the compartment motors 75A and 77A through a pair of normally closed contacts 103 of a D relay 104. As a result, the motors raise the compartment 69 until it engages sealingly the ceiling limit switch 70A, which, in turn, causes the ceiling solenoid 63A to retract the ceiling door 63 to its open position within the pocket P against the limit switch 64. It should be noted that the compartment 69 is moved into sealing engagement with the ceiling C prior to the opening of the ceiling door 63 to maintain the pressurized condition within the airplane 12. The closing of the limit switch 64 causes the operation of the B relay 107. When relay B operates, it closes its contacts 85 to operate the D relay 104. When the D relay operates, it closes its normally open contacts 109, which, in turn, cause the solenoid 81 to be energized. As a result, the latches L and L' are released, and thus the spring 79 is released to eject the parachute 18 through the opening 20 into its operating position, as shown in FIG. 1 of the drawings. It should be understood that, when the C relay operated, it opened its contacts 91 to release the A relay and its contacts 97 to turn off the solenoids 72 and 73. When the D relay operates, it prepares the motors to reverse their direction of operation via the contacts 103. When a manually operated switch 110 is closed and a manually operated switch 111 is opened simultaneously therewith, the C relay 93 restores and opens its contacts 101 and 102 and causes its normally closed contacts 112 to close, thereby opening the main or forward current path for the motors and providing a reverse direction path including the switch 110, the motors 75A and 77A, and the contacts 112. When that happens, the compartment 69 is moved downwardly out of engagement with the limit switch 70A, thereby causing the D relay to restore. It should be understood that the D relay needs only to be operated for only a sufficient amount of time to operate the solenoid 81 before the D relay restores. When the D relay restores, the solenoid 81 is de-energized to enable the parachute 18 to be stored and retained in the compartment to prepare for another operation of the apparatus 10 of the present invention.

Considering now the jet propulsion units and the control circuit 31 therefor, with particular reference to FIG. 1 and FIG. 4 of the drawings, the front jet propulsion unit 25 includes a downwardly directed port 113 for guiding a jet of air under pressure when the unit 25 is energized for the purpose of providing an upward lift for the front portion of the airplane 12 when the unit 25 is energized. Similarly a downwardly directed port 115 of the rear jet propulsion unit 27 provides a downwardly directed stream of air under pressure for providing an upwardly directed lift for the rear portion of the airplane 12. Also, the right and left jet propulsion units 29 and 30, respectively, include a pair of downwardly directed ports 117 and 119 for the respective right and left wing tips for providing upward lifts therefor when the right and left jet propulsion units are energized.

In order to control the flow of fluid from the jet propulsion unit, each one of them includes a valve shown schematically in FIG. 4 of the drawings. In this regard, a series of four valves 25A, 27A, 29A, and 30A are each operatively associated with corresponding ones of the respective jet propulsion units 25, 27, 29 and 30. A series of four gravity actuated switches 122, 124, 126 and 128 are closed under the force of gravity when the airplane 12 moves downwardly in the direction of the respective gravity actuated switches for energizing the respective electrically energizable valves 25A, 27A, 29A, and 30A. In this regard, the gravity actuated switches, which may be mercury switches, are mounted positionally within the airplane 12 to energize selectively the jet propulsion unit valves. For example, the switch 122 is mounted at the front jet propulsion unit 25 and is positioned such that, when the tip or front portion of the airplane 12 descends, the switch 122 closes automatically for causing the energization of the valve 25A for releasing fluid under pressure from the downwardly directed port 113. As a result, reaction force of the fluid escaping from the jet propulsion unit 25 tends to lift the front portion of the airplane 12 upwardly. Each propulsion unit, such as unit 25, may have a plurality of gravity switches, such as five different individually elevated mercury gravity switches (not shown) connected in parallel, and a plurality, such as five additional compressed air tanks (not shown) connected in parallel, in order to control smoothly the jet propulsion unit at different elevations, so that there is additional air flow as the nose of the airplane deviates further from the horizontal.

A series of four relays 130, 132, 134, and 136 are each connected in series with the respective gravity switches 122, 124, 126 and 128 so that the relays are energized when the respective gravity switches are closed. A series of four contacts 138, 1141, 143 and 145 of the respective relays 130, 132, 134 and 136 are closed when their relays are energized. Closing of the relay contacts causes the respective electrically energizable valves to open for releasing the fluid under pressure from the jet propulsion unit.

It should be understood that each one of the gravity-actuated switches are connected in series with its corresponding relay, and the contacts of the relay are connected in series with the corresponding ones of the valves, the two series circuits being connected in parallel with one another. Each one of the series circuits are energized by a battery 147 through an OFF switch 149, which is connected or otherwise linked mechanically to the pilot's steering devices (not shown) to de-activate automatically the jet propulsion units. Connected in series with the switch 149 is an ON switch 151 which serves as a manual switch for energizing the jet propulsion unit control circuit 31. In this regard, during normal operation of the airplane 12, the switch 149 de-energizes automatically the control of the jet propulsion units when the pilot, for example, causes the airplane to make turns or dives downwardly without causing the jet propulsion units to become activated. When a malfunction occurs, and, for example, the aircraft starts to dive, the front jet propulsion unit 25 is energized automatically to help pull the aircraft out of the dive. A low-speed energizable switch 153 is connected in parallel with the switch 151 so that, when the speed of the airplane 12 falls below a predetermined value, the switch 153 closes automatically as it is a speed sensitive device. The closing of the switch 153 connects the battery 147 to the valve circuit.

A normally closed pair of contacts 155 of a relay 157 are connected in parallel with the switches 151 and 153 to connect the battery 147 to the valve circuit in the event that an alternator 159 fails as a result of the failure of the electrical power for the airplane 12. In this regard, under normal operating conditions, the alternator 159 causes the relay 157 to be operated, and thus the contacts 155 are disposed in their opened condition. Thus, the contacts 155 under normal operating conditions do not connect the battery 147 to the valve circuit. However, should the electrical power supply (not shown) for the airplane 12 fail, the relay 157 restores to close its contacts 155, whereby the battery 147 is connected through the contacts 155 to the automatic valve circuit for the jet propulsion unit, regardless of whether the switches 151 and 153 are open or closed.

In order to energize the jet propulsion units independently and selectively without relying on the gravity switches, a series of four normally-open manually operated switches 122A, 124A, 126A and 128A are connected in parallel with respective ones of the gravity switches 122, 124, 126 and 128 so that the pilot can steer the airplane as it floats downwardly under parachute assist.

It should be understood that the control circuit 31, when energized, enables air under pressure to be delivered from the downwardly directed ports of the jet propulsion units. However, there are also laterally directed ports for the front jet propulsion unit 25 and the rear jet propulsion unit 27. In this regard, a pair of right and left laterally directed ports 162 and 164 are included in the front jet propulsion unit 25, and the right and left ports are separately controlled by valves (not shown) which are controlled manually by the pilot or other flight personnel. Similarly, a pair of right and left rear lateral ports 166 and 168 of the rear jet propulsion unit 27 enables air under pressure to be directed transversely to the rear portion of the airplane 12 for assisting its operation. The rear lateral ports 166 and 168 are separately controlled from the downwardly directed port 115, and in this regard, the lateral ports 166 and 168 are controlled by valves (not shown) which are manually controlled by the pilot or other flight personnel. The purpose of the lateral ports is to facilitate steering of the airplane 12 either during emergency landing procedures using the parachutes 18 and 19 or during other malfunctions where the pilot can activate them selectively by manual switches (not shown). Thus, the front and rear lateral ports enable air under pressure to be directed rightwardly or leftwardly at either the front or rear portion of the airplane 12 to cause the airplane 12 to react accordingly, thereby enabling the pilot to steer the airplane 12 to a safe landing and avoid obstacles.

Considering now the unit 30, a small diverter conduit 173 connects the outlet of one of the jet engines 175 to the port 119 through an electrically energizable valve 177 to provide an alternate source of fluid under pressure to the port 119. In this regard, the jet propulsion unit 30 includes a tank 30B containing compressed air under pressure for releasing same through the valve 30A to the port 119. Thus, through a switching circuit (not shown) either the tank valve 30A or the engine valve 177 may be opened to help correct the attitude of the wing 16. A similar arrangement (not shown) may be provided for the jet propulsion unit 29 and a jet engine, such as the engine 181 for the wing 15.

In the event that the airplane 12 is forced to land on water, an electrically operated air compressor 183 mounted in the tail portion of the airplane directs air under pressure rearwardly from an outlet conduit 185 for propelling the airplane along the water.

Let it also be understood that a rear parachute 179 is manually ejected by means of a push-button control unit (not shown) in order to slow the aircraft down while flying in the air prior to ejecting the overhead parachutes 18 and 19.

I claim:

1. In safety apparatus for use on aircraft to facilitate the in-flight maneuvering thereof to help overcome the malfunctioning thereof, the combination comprising: front parachute means mounted operatively at the front portions of the aircraft for adding to the buoyancy of the aircraft during landings thereof; rear parachute means mounted operatively at the rear portion of the aircraft for adding to the buoyancy of the aircraft during the landing thereof; means for moving said front and rear parachute means into their operating position; a plurality of auxiliary jet propulsion units containing fluid under pressure for propelling the aircraft to aid in its manueverability; port means of at least some of said auxiliary jet propulsion units mounted on the aircraft to direct fluid under pressure laterally away therefrom to cause lateral reaction movement of the aircraft for steering purposes; said means for moving said front and rear parachute means into their operating position includes an ejection assembly, said assembly including a storage compartment for one of said parachute means, the floor of the aircraft having an opening therein, a movable floor door means for covering over the opening in the floor with said storage compartment being stored beneath said floor, means defining an opening in the ceiling of the body of the aircraft, and a movable ceiling door means for covering over the opening in the ceiling, means for raising said compartment from beneath the floor through the opening therein to said opening in said ceiling, and means for ejecting the contents of the compartment through the opening in the ceiling of the aircraft, wherein said means for ejecting includes parachute ejecting spring means and an electrical solenoid for maintaining said spring means in a retracted position.

2. The combination according to claim 1, further including an ejection assembly control circuit, said ejection assembly control circuit being responsive to an initiation signal, said ejection assembly control circuit further including means for causing the opening of said ceiling door means, means for causing the opening of said floor door means, means for causing the raising of said compartment, means for triggering the release of said means for ejecting the contents of said compartment.

3. The combination according to claim 2, wherein said means for raising said compartment includes a plurality of nuts fixed to the exterior of said compartment, a plurality of motor-driven vertically disposed threaded rods extending through corresponding ones of said nuts so that, when said threaded rods are driven about their vertical axes, the nuts are driven upwardly to carry said compartment therewith.

4. In safety apparatus for use on aircraft to facilitate the in-flight maneuvering thereof to help overcome the malfunctioning thereof, the combination comprising: front parachute means mounted operatively at the front portions of the aircraft for adding to the buoyancy of the aircraft during landings thereof; rear parachute means mounted operatively at the rear portion of the aircraft for adding to the buoyancy of the aircraft during the landing thereof; means for moving said front and rear parachute means into their operating position; a plurality of auxiliary jet propulsion units containing fluid under pressure for propelling the aircraft to aid in its maneuverability; port means of at least some of said auxiliary jet propulsion units mounted on the aircraft to direct fluid under pressure laterally away therefrom to cause lateral reaction movement of the aircraft for steering purposes, downwardly directed port means of at least some of said auxiliary jet propulsion units mounted on the aircraft to direct fluid under pressure downwardly away therefrom to cause upward reaction movement of the aircraft for steering purposes, and a jet propulsion unit control circuit, said circuit including a plurality of gravity switch means for activating selectively the auxiliary jet propulsion unit when the aircraft assumes a preselected downwardly directed attitude, wherein said control circuit further includes a series of electrically energizable valves individually associated with said auxiliary jet propulsion units, a battery for energizing selectively said valves, relay switch means for switching batteries to said valves, an ON switch for connecting said battery to said relay switch means, an OFF switch for disconnecting the battery, a low speed switch connected in parallel with said ON switch for connecting the battery to said relay switch means when the speed of the aircraft falls below a predetermined value, power failure relay means responsive to a power failure to connect the battery to said relay switch means.

5. The combination according to claim 4, wherein at least some of said jet propulsion units are mounted at the front and rear portions of the aircraft and at the tips of the wings thereof.

6. The combination according to claim 4, further including inflatable pontoons for supporting the aircraft on a body of water during emergency landing procedures, a plurality of telescoping shock-absorbing legs to facilitate the emergency landing of the aircraft on hard ground.

7. The combination according to claim 4, wherein said means for moving said front and rear parachute means into their operating position includes an ejection assembly, said assembly including a storage compartment for one of said parachute means, means defining an opening in the ceiling of the body of the aircraft, means for raising said compartment to said opening in said ceiling, means for ejecting the contents of the compartment through the opening in the ceiling of the aircraft.

* * * * *